United States Patent Office 2,902,473
Patented Sept. 1, 1959

2,902,473
POLYESTERS OF FLUORINATED GLYCOLS AND PHTHALIC ACIDS

Donald D. Smith, Midland, Mich., assignor to Dow Corning Corporation, Midland, Mich., a corporation of Michigan No Drawing. Application May 17, 1956
Serial No. 585,384

1 Claim. (Cl. 260—75)

This invention relates to novel fluorinated polyesters of glycols and phthalic acids.

It is the object of this invention to prepare novel compositions of matter which are useful as thermally stable insulating varnishes and casting resins. Other advantages will be apparent from the following description.

This invention relates to polymeric compositions of matter having the unit formula $$[—OCH_2(CF_2)_nCH_2OOCRCO—]$$

in which $n$ is an integer of at least one and R is a phenylene radical.

The compositions of this invention are prepared by reacting fluorinated glycols of the formula $$HOCH_2(CF_2)_nCH_2OH$$

with a phthalic acid, a phthalyl halide or lower aliphatic esters of phthalic acids. The reactions can be carried out in the conventional manner for forming polyesters. The conditions will vary depending upon whether a phthalic acid or an acid chloride are employed. In general, reaction temperatures of from 100–200° C. give satisfactory results.

The glycols which are employed as starting materials in this invention can have any number of perfluoromethylene radicals in the chain. Preferably $n$ has a value from 1–5. Glycols of this type are known and are generally prepared starting with the corresponding 1,2-dichloroperfluorocycloalkene, oxidizing the double bond to a dicarboxylic acid and then reducing the dicarboxylic acid to the glycol.

For the purpose of this invention the glycol can be reacted with any phthalic acid such as terephthalic, isophthalic or phthalic acids and their ester forming derivatives such as terephthalyl chloride, isophthalyl chloride, dimethyl terephthalate or diethyl isophthalate.

The products of this invention exhibit excellent thermal stability and are useful both as thermoplastic resins and as thermosetting resins. One expeditious way of thermosetting the resin is to react the polymers with a diisocyanate such as toluene diisocyanate.

The following examples are illustrative only and should not be construed as limiting the invention which is properly delineated in the appended claims.

Example 1

7 parts by weight of 2,2,3,3,4,4-hexafluoro-1,5-pentanediol were intimately mixed with 5.1 parts by weight of terephthalyl chloride. The mixture was heated in a stream of nitrogen at 110° C. for 2 hours with occasional stirring. When the HCl evolution had ceased the temperature was raised to 140° C. and kept at that temperature overnight. The resulting polymer was a white, amorphous material which was soluble in acetone, ethylacetate, methylene dichloride and only slightly soluble in toluene. This polymer had the formula $$H[OCH_2(CF_2)_3CH_2OOCC_6H_4CO]_xOCH_2(CF_2)_3CH_2OH$$

8 parts by weight of this polymer were mixed with .08 part by weight toluene diisocyanate and .05 part by weight water and heated to effect solution. The melted mixture was heated at 150° C. under a pressure of 5,000 p.s.i. for 15 minutes. The resulting material was a tacky mass which upon standing set to a hard, tough, insoluble solid.

This material is useful for coating electrical conductors and for protective coatings for metals.

Example 2

When the glycol $HOCH_2(CF_2)_5CH_2OH$ is reacted with an equivalent amount of dimethyl isophthalate by heating the mixture at a temperature of 150° C. under conditions which allow methanol to escape, a thermoplastic polymer having the unit formula $$[OCH_2(CF_2)_5CH_2OOCC_6H_4CO]$$

is obtained.

Equivalent results are obtained when isophthalic acid is employed in lieu of its methyl ester.

That which is claimed is:

A resinous polymeric composition of matter having the unit formula $$[—OCH_2(CF_2)_nCH_2OOCRCO—]$$

in which $n$ is an integer of from one to five inclusive and R is a phenylene radical.

References Cited in the file of this patent

UNITED STATES PATENTS

| | | |
|---|---|---|
| 2,465,319 | Whinfield et al. | Mar. 22, 1949 |
| 2,568,501 | Husted et al. | Sept. 18, 1951 |
| 2,585,827 | Padbury | Feb. 12, 1952 |
| 2,697,087 | Hetzel | Dec. 14, 1954 |